Sept. 14, 1948. E. W. HOUGHTON 2,449,072
WATTMETER CIRCUIT
Filed March 28, 1947 2 Sheets-Sheet 1

INVENTOR
E. W. HOUGHTON
BY
Walter M. Hill
ATTORNEY

Sept. 14, 1948.  E. W. HOUGHTON  2,449,072
WATTMETER CIRCUIT
Filed March 28, 1947  2 Sheets-Sheet 2

INVENTOR
E. W. HOUGHTON
BY Walter M. Hill
ATTORNEY

Patented Sept. 14, 1948

2,449,072

UNITED STATES PATENT OFFICE 2,449,072

WATTMETER CIRCUIT

Edward W. Houghton, Chatham, N. J., assignor to Bell Telephone Laboratories, Incorporated, New York, N. Y., a corporation of New York Application March 28, 1947, Serial No. 737,948

17 Claims. (Cl. 171—95)

This invention relates to power measuring apparatus and more particularly to apparatus especially adapted for measuring the power delivered by high frequency systems.

Heretofore, power measurements have been made in high frequency circuits by utilizing a power measuring bridge containing a temperature variable resistor in one of its arms. The high frequency power to be measured is dissipated in this resistor whereby its temperature and resistance are changed, thus unbalancing the bridge. Various indicating devices have been employed to interpret the unbalance in terms of the power to be measured. In some of the more recent bridge circuits the bridge is returned to balance by changing the power dissipation in the thermally sensitive resistor by auxiliary means. This auxiliary means is calibrated and hence the change in power required to rebalance the bridge is known and is taken as the amount of high frequency power.

A common form of thermally sensitive resistor which has been found very useful in this art is known as the thermistor. This is a contraction of the words "thermal resistor" and designates a type of circuit element whose electrical resistance varies rapidly with change in temperature. In contrast with metals which have small positive temperature coefficients of resistance, thermistors are made from a class of materials known as semiconductors which have relatively large negative coefficients. More detailed information concerning these non-linear resistance devices may be obtained by reference to the Bell Laboratories Record for December 1940, page 106. Reference may also be made to the transactions section of Electrical Engineering for November 1946, page 711. An example of some of the prior art power measuring circuits is discussed in Electronic Industries for June 1945, page 79. The fact that most present day thermistors have negative coefficients is immaterial to this invention as materials of either sign are equally adaptable.

Measuring high frequency power by the prior art methods requires considerable time for the manual manipulation necessary to rebalance the bridge networks. A considerable source of error is also introduced by reason of the fact that the circuits are not compensated against ambient temperature variations. When taking into consideration the fact that the thermistor element itself can be made very sensitive to temperature variations, it becomes very clear that relatively large errors may be introduced by not taking into account ambient temperature variations.

It is an object of this invention to improve the accuracy of high frequency power measurements by providing a bridge measuring circuit of the type described wherein the balancing is automatically performed.

It is a further object of this invention to improve the accuracy of high frequency power measurement by automatically balancing the bridge network and also compensating it for ambient temperature variations.

The foregoing objects are achieved by this invention by providing in combination a power measuring bridge having a thermistor in one of its arms and means for applying the high frequency power to be measured to this thermistor to change its temperature and consequently its resistance. A separate source of variable power is connected to this bridge which is adapted to automatically maintain the bridge in substantial balance irrespective of all conditions tending to change the temperature and resistance of the thermistor. An indicating bridge is connected to the separate source of variable power to indicate the variations of this power which is a measure of the high frequency power. This indicating bridge also includes a thermistor as a part thereof and has a means for adjusting the power received by this thermistor from the variable power source whereby it may be made to render the indicating means insensitive to ambient temperature variations and sensitive only to any high frequency power applied to the thermistor in the power measuring bridge.

The invention may be better understood by referring to the accompanying drawings in which.

Figure 3:
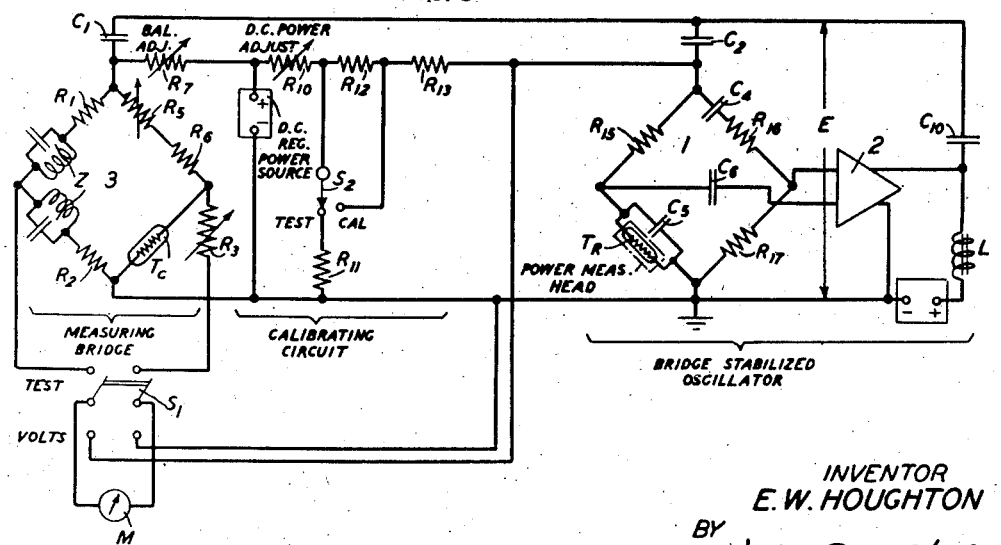
Figure 4:
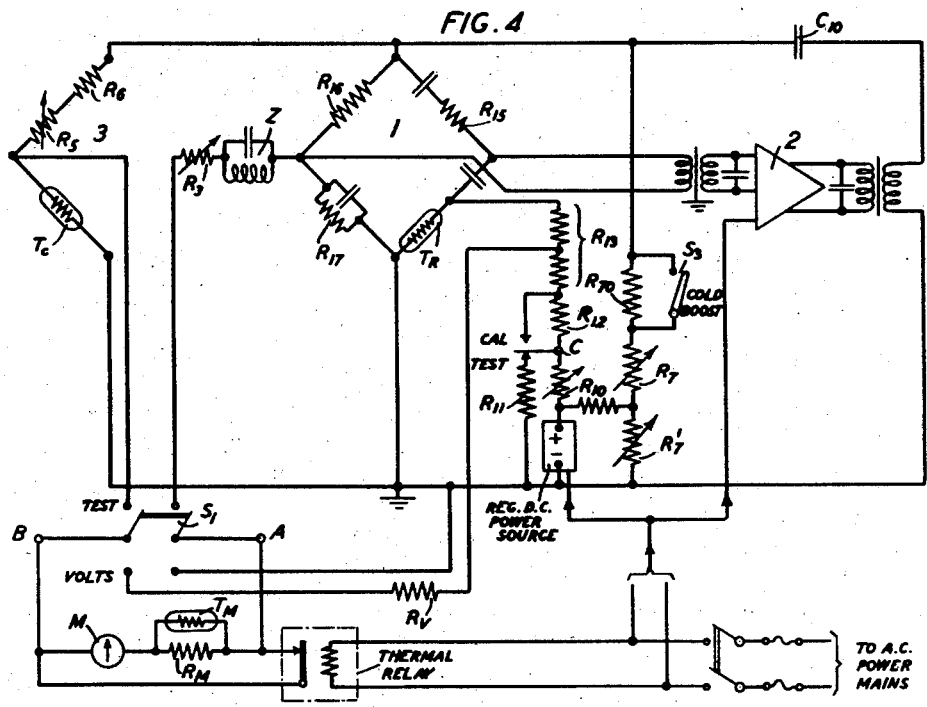
Figure 5:
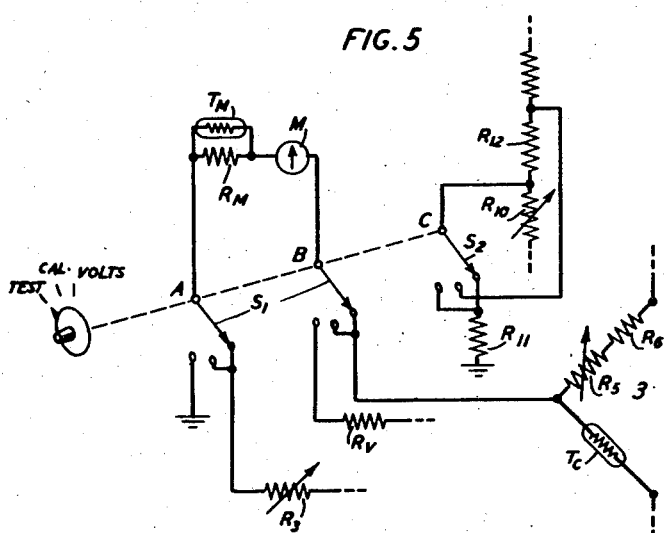
Figure 6:
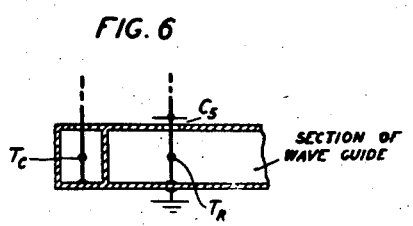

Fig. 3 discloses a complete operative schematic of one embodiment of this invention;

Fig. 4 is another diagram somewhat similar to Fig. 3 but illustrating a different embodiment of the invention;

Fig. 5 discloses a unitary switch control for controlling the switching operations of Fig. 4; and Fig. 6 is illustrative of a power measuring head useful in the practice of this invention.

Figure 1:
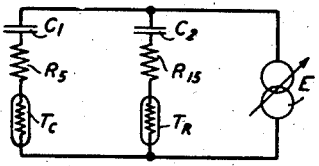
Fig. 1 is an elementary schematic illustrating one of the fundamental principles of this invention.

Fig. 1 serves to illustrate the temperature compensation principle of this invention which is based upon the fundamental properties of thermistors. It will be noted that a source of alternating electric energy of voltage E is connected to two parallel paths each comprising a capacitor in series with a linear resistor and a thermistor. The reactance of the capacitor in each case is negligibly small compared with the resistance of the remainder of each branch. Thus it will be noted that in one branch there is effectively the resistance of a thermistor $T_C$ in series with a resistor $R_s$, whereas in the other parallel branch there is a thermistor $T_R$ in series with a resistor $R_{1s}$. Now it is evident that as the voltage E of the alternating source is varied, the amount of power dissipated in each of the thermistors is also varied. The non-linear characteristic of these thermistors is such that their temperature and resistance will vary considerably with changes in voltage. Furthermore, these two thermistors are each subject to the same ambient temperature variations. The relationship between ambient temperature variations and electric power dissipated in the thermistor is expressed approximately as follows:

$$R = R_o e^{\frac{B}{T+CP}} \quad (1)$$

where

R = resistance of thermistor
$R_o$, B and C are constants
e = base of natural logarithms
T = ambient temperature in degrees absolute
P = total electric power dissipated in thermistor It is quite evident from inspection of Equation 1 that the resistance of a thermistor will decrease with either increasing ambient temperature or with increasing electric power dissipation. Of course in either case the temperature of the thermistor is actually increased by reason of the absorption of energy from the energy source. It is also evident that if the denominator of the exponent be kept constant that the resistance R of the thermistor will remain constant. This is expressed:

$$T + CP = a \text{ constant} \quad (2)$$

It is evident from Equation 2 that the absolute temperature is related to the electric power dissipated in the thermistor in a very simple manner provided, of course, the resistance of the thermistor is maintained constant. Referring again to Fig. 1, it will be noted that if the voltage E of the alternating source is maintained constant but the ambient temperature surrounding the thermistor should vary, the thermistor resistance and also the power dissipation therein will vary. Therefore, in order to maintain the resistance of thermistor $T_R$ constant for a change in ambient temperature, it is obvious that the voltage E of the alternating source must be varied to vary the electric power dissipation P as indicated by Equation 2.

To illustrate, assume that the ambient temperature has increased slightly. This tends to lower the thermistor resistance. The thermistor resistance may be returned to its original resistance by lowering the voltage E. Now while adjustments of this voltage will maintain constant the resistance of the thermistor $T_R$, these same changes in voltage may not necessarily properly correct and maintain constant the resistance of thermistor $T_C$. It may be observed that if the resistance $R_s$ in series with thermistor $T_C$ is varied, it will vary the amount of power dissipated in the thermistor $T_C$ and it also alters the change in power dissipated in $T_C$ with respect to changes in voltage E. It is, therefore, evident that if voltage E is continuously adjusted to keep thermistor $T_R$ constant, there is a particular value of resistance for $R_s$ such that thermistor $T_C$ will be similarly maintained constant for the same voltage variation. It is assumed, of course, that the same ambient temperature acts on both thermistors equally. It is thus apparent that the resistance of one thermistor is kept constant against variations in ambient temperature by varying the electric power in accordance with Equation 2 and that it is possible to similarly maintain constant the resistance of any other similarly constructed thermistor connected to the same source by simply adjusting the resistance in series with it to the proper fixed value.

Figure 2:
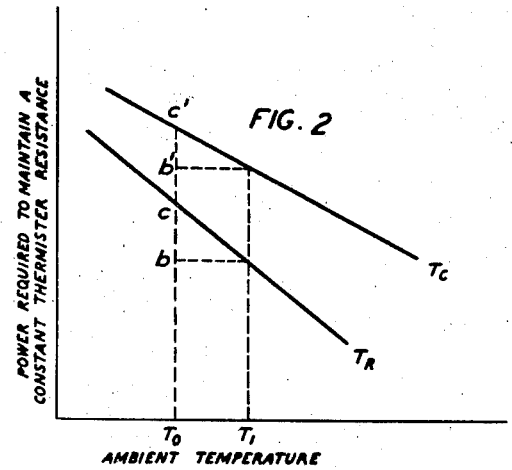
Fig. 2 is a diagram graphically illustrating the temperature compensating feature of this invention.

This principle will be still more clearly understood by referring to Fig. 2 wherein the power dissipation for the two thermistors is plotted against ambient temperature variations. It should be clearly understood that the ordinates refer to the power required to maintain the thermistor resistance constant. The curves are assumed characteristics for any two similarly constructed thermistors and are really plots of Equation 2. It is assumed that the characteristics of the two thermistors $T_R$ and $T_C$ are actually different (different power-temperature slopes) and their power requirements also differ at some ambient temperature $T_o$. At this temperature $T_o$ thermistor $T_R$ requires electric power of an amount indicated at point c whereas thermistor $T_C$ requires power of an amount represented by point c'. Now assume that the ambient temperature increases from $T_o$ to $T_1$. It is found that the amount of electric power to be dissipated in the thermistor $T_R$, in order to maintain its resistance constant, has been changed from c to b. However, the amount of power change required to maintain the resistance of thermistor $T_C$ constant is somewhat less, having reduced from point c' to b'. Thus it is apparent that the rate of change of electric power dissipation with respect to changes in ambient temperature may be different for one termistor than it is for the other.

Now referring to both Figs. 1 and 2, it is assumed that for an ambient temperature change from $T_o$ to $T_1$ the voltage E of the alternating source is lowered to maintain the resistance of thermistor $T_R$ constant, thereby producing a change in power dissipation in thermistor $T_R$ by the amount represented by c—b on Fig. 2. Since thermistor $T_C$ is connected in a circuit parallel with thermistor $T_R$, the same voltage variation occurs across the branch including thermistor $T_C$. The amount of power variation, however, need be only the amount represented by c'—b' in Fig. 2. By suitable adjustment of resistor $R_s$, exactly this change of power dissipation may be caused to take place in thermistor $T_C$. Because of the linear power-ambient temperature characteristic of these thermistors, it will be apparent that once this adjustment of resistor $R_s$ is made for a given ambient temperature variation, the resistances of both thermistors will remain constant for all ambient temperatures. This, of course, assumes that the power dissipation in one of them is automatically varied to maintain its resistance constant and that $R_s$ has been so adjusted that the resistance of thermistor $T_C$ did not change for one change of ambient temperature.

The exact value for resistance $R_s$ can be calculated from experimental data obtained from the two thermistors but it is usually just as convenient to determine its value experimentally in the following manner: The resistances of both thermistors at one ambient temperature and at one voltage E is measured. Both thermistors are placed in an oven or in a cooling chamber where the ambient temperature differs from the first one by some arbitrary amount, say 20° C. The resistance of $T_R$ is kept constant throughout these adjustments by adjusting voltage E. When thermal equilibrium is reached, $R_5$ is adjusted to only partially return thermistor $T_C$ to its initial resistance. The temperature is again changed an arbitrary amount and $R_5$ again adjusted as before. This operation of changing resistance and adjusting $R_5$ is repeated several times until the thermistor $T_C$ no longer changes its resistance with temperature. It must be remembered that voltage E is continuously adjusted during these adjustments to keep the resistance of thermistor $T_R$ constant.

In accordance with this invention, the power dissipation in one of the thermistors $T_R$ is automatically varied so as to maintain its resistance substantially constant. This may be observed by referring to Fig. 3. In this figure it will be noted that the thermistor $T_R$ is included in one of the arms of a bridge network 1. The other three arms are essentially resistive and comprise resistor $R_{15}$, $R_{16}$ and $R_{17}$, respectively. Capacitor $C_4$ has a negligibly small reactance compared with resistor $R_{16}$. Capacitor $C_5$ has a large reactance compared with the resistance of the thermistor $T_R$.

A high gain amplifier 2 has its input terminals connected to the output terminals of the bridge 1 through a capacitor $C_6$. The output of the high gain amplifier 2 is coupled through a parallel-resonant circuit comprising capacitor $C_{10}$ and inductor L. The input terminals of bridge 1 are included in this resonant circuit. Capacitor $C_2$ is of negligibly small reactance. This combination of bridge and high gain amplifier comprises a bridge stabilized oscillator of the general type disclosed in United States Patent 2,163,403 to Meacham granted June 20, 1939. The operation of the bridge stabilized oscillator as employed in this invention is as follows. The frequency is largely determined by the capacitance of capacitor $C_{10}$ and the inductance of inductor L. The voltage output of the amplifier 2 is determined by the resistance condition of thermistor $T_R$. For a given ambient temperature condition for which the thermistor resistance is higher than its value at balance, the voltage output of the amplifier will be high but gradually lowers as the thermistor resistance lowers to the point where the bridge is substantially balanced. Of course a slight unbalance will be necessary, as taught by the Meacham patent, in order to provide an input for the high gain amplifier 2. However, due to the high gain of this amplifier, this unbalance voltage may be very small and substantial balance is actually achieved.

The thermistor $T_R$ in this bridge is mounted within a power measuring head, more particularly described later. For this reason this thermistor may be referred to as the radio frequency thermistor. It is so located within the power measuring head that it forms a termination matching the characteristic impedance of the transmission line or wave guide to which it is attached. When radio frequency power is received by this thermistor, its temperature tends to increase and its resistance is lowered. However, due to the automatic balancing feature of the oscillator, any tendency for radio frequency power to change the temperature and resistance of this thermistor will cause the oscillator to change its output level thereby delivering less power to the thermistor. The net result is that for a given change in radio frequency power supplied to the thermistor, substantially the same change in oscillator power will take place but of opposite sign, so that the sum of the power from the oscillator and the radio frequency power remains substantially constant. It will, therefore, be observed that a change in radio frequency power results in a change in power delivered by the oscillator and hence a change in oscillator voltage; that is, a change in the output voltage from the high gain amplifier 2. As the radio frequency power increases, the output voltage from the oscillator amplifier 2 lowers and vice versa.

While a specific automatic balancing means has been disclosed in Fig. 3, it is evident to those skilled in the art that it is not essential that this particular arrangement be employed. Other known arrangements may be substituted to provide essentially the same functions. For example, the automatic balancing arrangement shown in United States Patent 2,166,935 to Adams granted July 25, 1939 or the balancing arrangement of United States Patent 2,239,781 to Golicke et al. granted April 29, 1941 will each perform substantially the same function. The oscillator arrangement disclosed in this application, however, is preferred because of its simplicity and speed of response.

It was previously stated that a change in radio frequency power received by the radio frequency thermistor $T_R$ produces a change in output voltage supplied from the amplifier 2 of the oscillator. This is, of course, also the feedback voltage supplied to the bridge 1 through capacitor $C_2$. In order to measure this radio frequency power, it is only necessary to provide some means of measuring the change in output voltage which it causes as this is a measure of the change in power which amplifier 2 delivers to thermistor $T_R$ and therefore a direct measure of the radio frequency power.

In Fig. 3 this is accomplished by means of an indicating bridge 3 connected to the output of amplifier 2 through a blocking capacitor $C_1$. Basically, this bridge operates on substantially the same principle as the voltage measuring bridge disclosed in United States Patent 339,058 to Howell, granted March 30, 1886 or by the bridge arrangement of the Greinacher et al. Patent 1,287,970 granted December 17, 1918. Additional refinements, however, which are necessary to the successful practice of this invention are incorporated.

It will be noted that this bridge 3 comprises four essentially resistive arms and a meter M across its horizontal diagonal. One arm contains an adjustable resistor $R_5$ in series with a fixed resistor $R_4$. Two of the other arms contain resistors $R_1$ and $R_2$, respectively. The fourth arm contains a thermistor $T_C$ similar in characteristics to the thermistor $T_R$ but not necessarily identical. In fact it is quite difficult to make thermistors with identical characteristics. The two arms containing resistors $R_1$ and $R_2$, respectively, also each contain an anti-resonant impedance Z. These impedances are tuned to the frequency of the oscillator, thereby effectively preventing the passage of any oscillator current through either of these two bridge arms. A direct current source of regulated voltage is connected across the vertical diagonal of the bridge to provide current for the direct current meter M. It will be understood that when thermistor $T_c$, which may hereinafter be referred to as the compensating thermistor, is at a resistance which balances the bridge, no current will flow through meter M. As the radio frequency energy to be measured is applied to the thermistor $T_R$ and the voltage output of amplifier 2 changes, the current passing through the compensating thermistor $T_c$ also changes, thereby changing its resistance. This unbalances the bridge and causes a deflection of meter M. Thermistor $T_c$ is called the compensating thermistor because in addition to its function as a nonlinear resistor in the indicating bridge it also acts to compensate the entire system against the effects of ambient temperature changes.

In order to preheat the thermistors above normal ambient temperature, the direct current source of regulated voltage is connected to both bridges through variable resistors $R_7$ and $R_{10}$, respectively. This source also provides a known change in power to the radio frequency thermistor $T_R$ for calibration purposes, which will be more fully described later.

Comparing Fig. 3 with Fig. 1, it will be noted that resistor $R_{15}$ of the power measuring bridge 1 corresponds with resistor $R_{15}$ of Fig. 1 and that this resistor is in series with the radio frequency thermistor $T_R$. Also, variable resistor $R_5$ in one arm of the indicating bridge 3 will be found in series with the compensating thermistor $T_c$ and corresponds with $R_5$ of Fig. 1. The operation of the bridge stabilized oscillator of Fig. 3 is such as to automatically provide the function previously described for the variable alternating power source of Fig. 1, thereby automatically maintaining the radio frequency thermistor $T_R$ at a substantially constant resistance independent of ambient temperature variation. It may here be stated that an ambient temperature variation acting on radio frequency thermistor $T_R$ has the same effect on the voltage output of the oscillator as would radio frequency energy dissipated therein. Therefore, unless compensating measures are taken, ambient temperature variations will cause false readings of the indicating bridge. By adjusting variable resistor $R_5$ in the indicating bridge 3 of Fig. 3, the compensating thermistor $T_c$ can be caused to remain of constant resistance independent of ambient temperature variations. Consequently the indicating bridge 3 is rendered effectively insensitive to any ambient temperature variation in exactly the manner described for Fig. 1.

The preliminary adjustments for adjusting the compensating circuit and also to calibrate the system of Fig. 3 are as follows: With switch $S_1$ in its Volts position, the meter is connected directly across the input terminals of the power measuring bridge 1. Switch $S_2$ should be in its Test position. The direct current power adjusting resistor $R_{10}$ is then adjusted until the meter M reads a predetermined voltage. It is not particularly critical what this voltage is so long as it supplies enough power to the radio frequency thermistor to raise its temperature somewhat above ambient and thereby lower the output voltage E of the amplifier 2 to some reasonably low level within the operating range of the oscillator. Switch $S_1$ is then moved to its Test position there- by connecting meter M across the indicating bridge 3. A variable resistor $R_7$ is then adjusted to bring the indicating bridge 3 to balance as indicated by its meter M. If the instrument is to be used under constant ambient temperature conditions it can be calibrated at this point but if not, compensating adjustments are necessary.

As the two thermistors are both subjected to the same ambient temperature conditions, the ambient temperature is artificially raised or lowered several degrees from the original condition. This will usually cause a deflection of meter M. Balance is partially restored by adjusting the compensating adjusting rheostat $R_5$ and the temperature again changed followed by another adjustment of $R_5$. This is repeated as described for Fig. 1 until no change in meter deflection occurs with wide variations of temperature. Changes in ambient temperature over a considerable range should now have no effect, whatever, on the deflection of meter M. As previously stated this is a very important feature of this invention without which successful rapid operation would be impossible.

Switch $S_2$ is now moved from its Test position to its calibrating position Cal. It will be observed that this removes the shunt resistor $R_{11}$ from the circuit and short-circuits the series resistor $R_{12}$, leaving only the variable direct current power adjusting resistor $R_{10}$ and resistor $R_{13}$ in circuit with the direct current power source and the power measuring bridge 1. Preferably, this does not change the impedance from the power source looking into the power measuring bridge to the right of the variable resistor $R_{10}$. However, it does change the amount of direct current power dissipated in the radio frequency thermistor $T_R$ by an exact known amount, for example one milliwatt. As this change in power effects only one of the thermistors, the resulting voltage change from amplifier 2 will cause the indicating bridge 3 to unbalance thereby producing a deflection of meter M. By adjusting series resistor $R_3$, the deflection of meter M may be made full scale or any other convenient amount to which the scale of meter M is calibrated. Now by returning the calibrating switch $S_2$ to its Test position, the instrument is ready for measuring radio frequency power. Any radio frequency power dissipated in the radio frequency thermistor $T_R$ will produce a voltage change of amplifier 2 as previously explained, thereby unbalancing the indicating bridge 3 by an amount corresponding to the amount of radio frequency power dissipated. Meter M, having been calibrated for a known amount of power, will indicate directly the amount of power received from the radio frequency source.

Before leaving Fig. 3, specific mention may be made of a few of its components. The main purpose for blocking capacitor $C_4$ in the power measuring bridge 1 is to exclude direct current from that branch of the bridge. Its reactance is sufficiently low to have no appreciable effect on the balance condition of the bridge. Therefore, this arm, in so far as the oscillator frequency is concerned, is essentially resistive. The power measuring head itself is so constructed as to permit the passage of high frequency energy through the radio frequency thermistor $T_R$ but excludes it from all other portions of the bridge. Similarly, direct current energy and the alternating current energy from the oscillator may flow freely through the radio frequency thermistor $T_R$. In the indicating bridge 3 the impedances Z have a negligibly small direct current resistance but a substantially infinite impedance to the frequency of the oscillator. Therefore, the alternating current from the oscillator is confined to the bridge branch comprising the compensating thermistor Tc and the compensating adjusting rheostat $R_5$ and resistor $R_6$. Direct current, however, flows freely through both branches of this bridge.

Fig. 4 discloses a different embodiment of this invention, although basically identical with the arrangement shown in Fig. 3. In this figure the power measuring bridge 1 and the amplifier 2 are coupled in essentially the same manner as in Fig. 3 except that transformers are employed. The frequency of this oscillator, as in Fig. 3, is also not critical, and is controlled largely by tuning the amplifier by conventional means. The capacitors in series with the radio frequency thermistor $T_R$ and resistor $R_{15}$, effectively block the passage of any direct current through these two arms of the bridge except, of course, for the obvious path provided through the radio frequency thermistor $T_R$.

Arms $R_{16}$ and $R_{17}$ of the power measuring bridge 1 have the dual function of providing ratio arms for not only the power measuring bridge 1 but also for the indicating bridge 3. In this way the branch comprising resistors $R_1$ and $R_2$ of the indicating bridge 3 of Fig. 3 has been eliminated. The operation, however, is identical. Currents of oscillator frequency are isolated from the meter circuit by the anti-resonant impedance Z which will be found connected in series with the meter when the meter is connected to the indicating bridge 3. A meter resistance network comprising resistor $R_M$ in parallel with a temperature compensating thermistor $T_M$ provides temperature compensation for the meter M, thereby compensating the meter M for changes in its sensitivity with changes in ambient temperature. Of course, this feature could also be used in connection with the circuit of Fig. 3. In order to protect the meter M against unduly large deflections during the warm-up period, a thermal relay has been connected to short-circuit the meter during this period. Consequently, when the main switch from the alternating current power main is closed to provide power to the regulated direct current power source and the high gain amplifier 2, the heating element of the thermal relay begins to heat. By the time the various components in the regulated direct current power source and the amplifier 2 are sufficiently heated the thermal relay opens its contacts thereby removing the short circuit from the meter circuit M. These contacts remain open so long as the main switch is closed.

At low temperatures some difficulty is experienced in getting the compensating thermistor Tc to heat up. The heating of this thermistor may be accomplished by temporarily closing the cold boost switch $S_3$ which momentarily short-circuits a series-connected resistor $R_{70}$. This materially increases the current through the compensating thermistor thereby bringing its resistance down into the operating region. When the resistance has sufficiently lowered, this switch is opened.

The operation of this circuit is substantially the same as previously described for Fig. 3. Briefly, however, and with particular reference to Fig. 4, the operation is as follows: Meter switch $S_1$ is thrown to its Volts position. Switch $S_2$ is left on its Test position as indicated in Fig. 4. Variable resistor $R_{10}$ is then adjusted until the meter indicates some predetermined voltage. As previously stated this voltage is not particularly critical but should be some voltage previously determined as sufficient to bring the radio frequency thermistor to the proper operating temperature above ambient. A multiplying resistor $R_V$ may be connected in series with the meter when it is used as a voltmeter. If necessary, the cold switch $S_3$ may be momentarily closed. Switch $S_1$ is then returned to its Test position. Meter M will undoubtedly be deflected. A preliminary balance may be obtained by adjusting resistor $R_7$, or if necessary both $R_7$ and $R_7'$.

The ambient temperature which effects both thermistors $T_R$ and $T_C$ is then changed by several degrees, for example 20° C. Unless the instrument is accidentally correctly adjusted to compensate for ambient temperature variations the meter M will be again deflected. $R_5$ in series with the compensating thermistor should then be adjusted in the direction to only partially restore balance. The position of the meter M is noted and the ambient temperature is again changed. The direction in the change of the deflection of meter M is once more noted and resistor $R_5$ is once more adjusted to return the pointer part way to the position it assumed just before the last temperature change. This is followed by another change in temperature and another adjustment of variable resistor $R_5$. This series of operations is continued until the two thermistors may be carried through wide temperature variations without any change in deflection of the meter M. The meter M may then be brought to exact zero by adjusting variable resistor $R_7$.

The apparatus is calibrated by moving switch $S_2$ to its Cal position. This, as in Fig. 3, increases the direct current power to the radio frequency thermistor $T_R$ by a known amount, for example one milliwatt. Rheostat $R_3$ is then adjusted until meter M assumes a convenient deflection, for example, full scale or some other deflection convenient to the calibration of its scale. The switch $S_2$ is returned to its Test position and the apparatus is ready for measuring radio frequency power. It will indicate directly the amount of radio frequency power dissipated in the radio frequency thermistor $T_R$.

Fig. 5 discloses a convenient switching arrangement ganging the two blades of switch $S_1$ and the single switch blade of switch $S_2$. It will be noted that the switch blades of $S_1$ are connected to points A and B respectively of Fig. 4 while the switch blade of $S_2$ is connected to point C of Fig. 4. The connections to the associated apparatus is clearly shown in Fig. 5 and a more comparison of this figure with Fig. 4 clearly indicates how the connections are made. From the previous description of the operation of Fig. 4, the operation of Fig. 5 is obvious and no further description is necessary.

Fig. 6 schematically discloses one form of power measuring head useful in the practice of this invention. In this figure it will be noted that the radio frequency thermistor $T_R$ is included in the power measuring head associated with a section of wave guide. The capacitance $C_5$ is of such size as to provide a very low reactance to the high frequency energy impressed on the radio frequency thermistor $T_R$. However, this capacitance has negligibly small reactance to the alternating current from the bridge stabilized oscillator. One terminal of the thermistor is connected to the inside wall of the power measuring head. This element is also grounded and, of course, comprises the grounded end of the thermistor as shown in Figs. 3 and 4. The thermistor is so located in the power measuring head as to absorb all of the energy coming from the power source, that is to say, this resistance is made to exactly equal the characteristic impedance of the wave guide itself. The construction of this power measuring head is substantially identical to and follows the principles set forth in United States Patent 2,151,118 to A. P. King and A. E. Bowen granted March 21, 1939, and also United States 2,232,179, granted to A. P. King, February 18, 1941, particularly Fig. 20 thereof. Another power measuring head obeying substantially the same laws and which may be used in the practice of this invention may be found in the above-cited reference to Electronic Industries for June 1945, page 80. In order to insure that the ambient temperature affects both thermistors equally, the compensating thermistor Tc is included inside a metallic enclosure thermally attached to the power measuring head as shown in Fig. 6. The connection of this thermistor into the bridge circuits of Figs. 3 and 4 is also obvious.

What is claimed is:

1. A high frequency power measuring circuit comprising in combination a bridge network having four arms, one of which arms includes a thermistor, means for applying the high frequency power to be measured to said thermistor to tend to change its temperature and consequently its resistance, a separate source of variable power connected to said bridge adapted to automatically supply variable power thereto to maintain it in substantial balance irrespective of conditions tending to change the temperature and resistance of the thermistor, an indicating bridge also having four arms connected to said source of power and including an indicating instrument across a diagonal thereof for indicating a change in power supplied by the power source to the first bridge, a thermistor also included in one arm of the indicating bridge and a variable impedance connected in circuit with the last-named thermistor to adjust the power it receives from said variable power source, whereby said last-named thermistor may be made to render the indicating bridge insensitive to ambient temperature variations and sensitive only to any high frequency power applied to the first-named thermistor.

2. The combination in accordance with claim 1 wherein said indicating instrument is a direct current galvanometer and there is added to said combination a source of direct current and adjustable resistors connecting the direct current source in series with each of said thermistors, whereby direct current power of adjustable magnitude may be dissipated in each of the two thermistors.

3. The combination in accordance with claim 2 and a calibrating switch connected across a part of the resistance in series with the direct current source and said first-named thermistor, whereby the power dissipated in said thermistor may be changed by a known amount for calibration purposes.

4. A high frequency power measuring circuit comprising in combination a bridge network having four arms, one of which arms includes a thermistor, a power measuring head comprising a section of metallic wave guide with the thermistor mounted within its walls to absorb energy from the electric power delivered by the wave guide whereby the temperature and resistance of said thermistor is changed, a separate source of variable power connected to said bridge adapted to automatically supply variable power thereto to maintain it in substantial balance irrespective of conditions tending to change the temperature and resistance of the thermistor, an indicating bridge also having four arms connected to said source of power and including an indicating instrument across a diagonal thereof for indicating a change in power supplied by the power source to the first bridge, a thermistor also included in one arm of the indicating bridge and a variable impedance connected in circuit with the last-named thermistor to adjust the power it receives from said variable power source, whereby said last-named thermistor may be made to render the indicating bridge insensitive to ambient temperature variations and sensitive only to any high frequency power applied to the first-named thermistor.

5. A high frequency power measuring circuit comprising in combination a bridge network having four arms, one of which arms includes a thermistor, means for applying the high frequency power to be measured to said thermistor to tend to change its temperature and consequently its resistance, a high gain amplifier with input and output terminals connected respectively to output and input terminals of said bridge whereby the bridge is automatically maintained in substantial balance irrespective of conditions tending to change the temperature and resistance of the thermistor, an indicating bridge also having four arms connected to said source of power and including an indicating instrument across a diagonal thereof for indicating a change in power supplied by the power source to the first bridge, a thermistor also included in one arm of the indicating bridge and a variable impedance connected in circuit with the last-named thermistor to adjust the power it receives from said variable power source, whereby said last-named thermistor may be made to render the indicating bridge insensitive to ambient temperature variations and sensitive only to any high frequency power applied to the first-named thermistor.

6. The combination in accordance with claim 5 wherein said indicating instrument is a direct current galvanometer and there is added to said combination a source of direct current and adjustable resistors connecting the direct current source in series with each of said thermistors, whereby direct current power of adjustable magnitude may be dissipated in each of the two thermistors.

7. The combination in accordance with claim 6 and a calibrating switch connected across a part of the resistance in series with the direct current source and said first-named thermistor, whereby the power dissipated in said thermistor may be changed by a known amount for calibration purposes.

8. A high frequency power measuring circuit comprising in combination a bridge network having four arms, one of which arms includes a thermistor, means for applying the high frequency power to be measured to said thermistor to tend to change its temperature and consequently its resistance, a high gain amplifier with input and output terminals connected respectively to output and input terminals of said bridge to constitute with the bridge a bridge stabilized oscillator wherein the bridge is automatically maintained in substantial balance irrespective of conditions tending to change the temperature and resistance of the thermistor, an indicating bridge also having four arms connected to said source of power and including an indicating instrument across a diagonal thereof for indicating a change of power supplied by the power source to the first bridge, a thermistor also included in one arm of the indicating bridge and a variable impedance connected in circuit with the last-named thermistor to adjust the power it receives from said variable power source, whereby said last-named thermistor may be made to render the indicating bridge insensitive to ambient temperature variations and sensitive only to any high frequency power applied to the first-named thermistor.

9. The combination in accordance with claim 8 wherein said indicating instrument is a direct current galvanometer and there is added to said combination a source of direct current and adjustable resistors connecting the direct current source in series with each of said thermistors, whereby direct current power of adjustable magnitude may be dissipated in each of the two thermistors.

10. The combination in accordance with claim 9 and a calibrating switch connected across a part of the resistance in series with the direct current source and said first-named thermistor, whereby the power dissipated in said thermistor may be changed by a known amount for calibration purposes.

11. A high frequency power measuring circuit comprising in combination a bridge network having four arms, one of which arms includes a thermistor, a power measuring head comprising a section of metallic wave guide with the thermistor mounted within its walls to absorb energy from the electric power delivered by the wave guide whereby the temperature and resistance of said thermistor are changed, a separate source of variable power connected to said bridge adapted to automatically supply variable power thereto to maintain it in substantial balance irrespective of conditions tending to change the temperature and resistance of the thermistor, an indicating bridge also having four arms connected to said source of power and including an indicating instrument across a diagonal thereof for indicating a change in power supplied by the power source to the first bridge, a thermistor also included in one arm of the indicating bridge, said thermistor being mounted within a thermally conductive enclosure in thermal contact with said wave guide and a variable impedance connected in circuit with the last-named thermistor to adjust the power it receives from said variable power source, whereby said last-named thermistor may be made to render the indicating bridge insensitive to ambient temperature variations and sensitive only to any high frequency power applied to the first-named thermistor.

12. The combination in accordance with claim 11 wherein said indicating instrument is a direct current galvanometer and there is added to said combination a source of direct current and adjustable resistors connecting the direct current source in series with each of said thermistors, whereby direct current power of adjustable magnitude may be dissipated in each of the two thermistors.

13. The combination in accordance with claim 12 and a calibrating switch connected across a part of the resistance in series with the direct current source and said first-named thermistor, whereby the power dissipated in said thermistor may be changed by a known amount for calibration purposes.

14. A high frequency power measuring circuit comprising in combination a bridge network having four arms, one of which arms includes a thermistor, a power measuring head comprising a section of metallic wave guide with the thermistor mounted within its walls to absorb energy from the electric power delivered by the wave guide whereby the temperature and resistance of said thermistor are changed, a high gain amplifier with input and output terminals connected respectively to output and input terminals of said bridge whereby the bridge is automatically maintained in substantial balance irrespective of conditions tending to change the temperature and resistance of the thermistor, an indicating bridge also having four arms connected to said source of power and including an indicating instrument across a diagonal thereof for indicating a change in power supplied by the power source to the first bridge, a thermistor also included in one arm of the indicating bridge, and a variable impedance connected in circuit with the last-named thermistor to adjust the power it receives from said variable power source, whereby said last-named thermistor may be made to render the indicating bridge insensitive to ambient temperature variations and sensitive only to any high frequency power applied to the first-named thermistor.

15. A high frequency power measuring circuit comprising in combination a bridge network having four arms, one of which arms includes a thermistor, a power measuring head comprising a section of metallic wave guide with the thermistor mounted within its walls to absorb energy from the electric power delivered by the wave guide whereby the temperature and resistance of the thermistor are changed, a high gain amplifier with input and output terminals connected respectively to output and input terminals of said bridge to constitute with the bridge a bridge stabilized oscillator wherein the bridge is automatically maintained in substantial balance irrespective of conditions tending to change the temperature and resistance of the thermistor, an indicating bridge also having four arms connected to said source of power and including an indicating instrument across a diagonal thereof for indicating a change in power supplied by the power source to the first bridge, a thermistor also included in one arm of the indicating bridge and a variable impedance connected in circuit with the last-named thermistor to adjust the power it receives from said variable power source, whereby said last-named thermistor may be made to render the indicating bridge insensitive to ambient temperature variations and sensitive only to any high frequency power applied to the first-named thermistor.

16. A high frequency power measuring circuit comprising in combination a bridge network having four arms, one of which arms includes a thermistor, a power measuring head comprising a section of metallic wave guide with the thermistor mounted within its walls to absorb energy from the electric power delivered by the wave guide whereby the temperature and resistance of said thermistor are changed, a high gain amplifier with input and output terminals connected respectively to output and input terminals of said bridge whereby the bridge is automatically maintained in substantial balance irrespective of conditions tending to change the temperature and resistance of the thermistor, an indicating bridge also having four arms connected to said source of power and including an indicating instrument across a diagonal thereof for indicating a change in power supplied by the power source to the first bridge, a thermistor also included in one arm of the indicating bridge, said thermistor being mounted in a thermally conductive enclosure in thermal contact with said wave guide and a variable impedance connected in circuit with the last-mentioned thermistor to adjust the power it receives from said variable power source, whereby said last-named thermistor may be made to render the indicating bridge insensitive to ambient temperature variations and sensitive only to any high frequency power applied to the first-named thermistor.

17. A high frequency power measuring circuit comprising in combination a bridge network having four arms, one of which arms includes a thermistor, a power measuring head comprising a section of metallic wave guide with the thermistor mounted within its walls to absorb energy from the electric power delivered by the wave guide whereby the temperature and resistance of said thermistor are changed, a high gain amplifier with input and output terminals connected respectively to output and input terminals of said bridge to constitute with the bridge a bridge stabilized oscillator wherein the bridge is automatically maintained in substantial balance irrespective of conditions tending to change the temperature and resistance of the thermistor, an indicating bridge also having four arms connected to said source of power and including an indicating instrument across a diagonal thereof for indicating a change in power supplied by the power source to the first bridge, a thermistor also included in one arm of the indicating bridge, said thermistor being mounted within a thermally conductive enclosure in thermal contact with said wave guide and a variable impedance connected in circuit with the last-named thermistor to adjust the power it receives from said variable power source, whereby said last-named thermistor may be made to render the indicating bridge insensitive to ambient temperature variations and sensitive only to any high frequency power applied to the first-named thermistor.

EDWARD W. HOUGHTON.